United States Patent
Na et al.

(10) Patent No.: US 9,654,720 B2
(45) Date of Patent: May 16, 2017

(54) DISPLAY APPARATUS AND METHOD FOR CONTROLLING THE SAME

(71) Applicant: SAMSUNG ELECTRONICS CO., LTD., Suwon-si (KR)

(72) Inventors: Moon-sung Na, Suwon-si (KR); Kwan-young Kim, Suwon-si (KR); Hyun-kyu Yun, Seoul (KR); Myoung-jun Lee, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/471,383

(22) Filed: Aug. 28, 2014

(65) Prior Publication Data

US 2015/0062443 A1   Mar. 5, 2015

(30) Foreign Application Priority Data

Sep. 2, 2013   (KR) .................. 10-2013-0104830

(51) Int. Cl.
| | |
|---|---|
| *H04N 5/44* | (2011.01) |
| *G08C 17/02* | (2006.01) |
| *H04N 21/422* | (2011.01) |
| *H04N 21/485* | (2011.01) |
| *G06F 3/0488* | (2013.01) |

(52) U.S. Cl.
CPC .......... *H04N 5/4403* (2013.01); *G08C 17/02* (2013.01); *H04N 21/42222* (2013.01); *H04N 21/42224* (2013.01); *H04N 21/485* (2013.01); *G06F 3/04883* (2013.01); *G06F 2203/0384* (2013.01); *G08C 2201/30* (2013.01); *G08C 2201/32* (2013.01); *G08C 2201/34* (2013.01); *H04N 2005/443* (2013.01); *H04N 2005/4408* (2013.01)

(58) Field of Classification Search
USPC .................................. 348/734; 345/156, 173
See application file for complete search history.

(56) References Cited

U.S. PATENT DOCUMENTS

| | | | | |
|---|---|---|---|---|
| 5,545,857 A * | 8/1996 | Lee | ...................... | G06F 3/04883 178/18.03 |
| 8,144,129 B2 * | 3/2012 | Hotelling | .............. | G06F 1/1626 345/173 |
| 8,456,436 B2 * | 6/2013 | Fujimura | ................ | G06F 3/038 178/18.03 |
| 8,970,503 B2 * | 3/2015 | Christie | .............. | G06F 3/04883 178/18.01 |

(Continued)

FOREIGN PATENT DOCUMENTS

| | | |
|---|---|---|
| KR | 10-2008-0094404 A | 10/2008 |
| KR | 10-2010-0089216 A | 8/2010 |

*Primary Examiner* — Paulos M Natnael
(74) *Attorney, Agent, or Firm* — Sughrue Mion, PLLC

(57) ABSTRACT

A display apparatus is provided, which includes a receiver configured to receive a writing trace performed on a remote controller, a detector configured to extract a character that corresponds to the writing trace, a display configured to display the character and at least one item that corresponds to the character, and a controller configured to, if a user's operation is performed in one direction on the remote controller, automatically execute a function that corresponds to the at least one item that is positioned in the direction in which the user's operation is performed.

20 Claims, 11 Drawing Sheets

(56) References Cited

U.S. PATENT DOCUMENTS

| | | | |
|---|---|---|---|
| 2005/0264538 A1* | 12/2005 | Yeh | G06F 3/03547 345/173 |
| 2007/0152961 A1* | 7/2007 | Dunton | G06F 3/017 345/156 |
| 2013/0050074 A1* | 2/2013 | Yasuda | G06F 1/1694 345/156 |

* cited by examiner

DISPLAY APPARATUS AND METHOD FOR CONTROLLING THE SAME

CROSS-REFERENCE TO RELATED APPLICATION

This application claims priority from Korean Patent Application No. 10-2013-0104830, filed on Sep. 2, 2013, in the Korean Intellectual Property Office, the disclosure of which is incorporated herein by reference in its entirety.

BACKGROUND

1. Field

Apparatuses and methods consistent with exemplary embodiments relate to a display apparatus and a method for controlling the same, and more particularly to a display apparatus and a method for controlling the display apparatus, which can perform a function desired by a user through a simple operation of a remote controller.

2. Description of the Related Art

Recently, with the development of technologies, TVs that adopt various functions have been released. Users not only can view content through such TVs but also can experience various kinds of content and applications through combination with the Internet. Smart TVs can provide such various functions.

As a device for controlling such a TV, a remote controller is used. The remote controller is connected to a TV by wire or wirelessly to control the TV to execute a function desired by a user.

In proportion to inclusion of various functions in the TV, button arrangement on a remote controller that is necessary to use such functions becomes complicated. Accordingly, in order to lower the burden of using various functions due to the complicated arrangement of the remote controller buttons, it is necessary to simplify a TV, a remote controller and a UI for them. Accordingly, the remote controller that controls the TV is also required to have a simple design, such as minimization of the number of buttons provided thereon.

In addition, it is necessary to minimize a user's operation including the user operation of pressing a button for controlling the TV.

SUMMARY

The present disclosure has been made to address at least the above needs and to provide at least the advantages described below, and an aspect of the present disclosure is to provide a display apparatus and a method for controlling the same, which can automatically execute a function corresponding to an item that is positioned in a direction in which a user's operation is made. Alternatively, exemplary embodiments may not address the needs mentioned above.

According to one aspect of the present disclosure, a display apparatus includes a receiver configured to receive a writing trace performed on a touch pad of a remote controller; a detector configured to extract a character that corresponds to the writing trace; a display configured to display the character and at least one item that corresponds to the character; and a controller configured to, if a user's operation is performed in one direction on the remote controller, automatically execute a function that corresponds to the at least one item that is positioned in the direction in which the user's operation is performed.

If a subsequent writing is performed on the remote controller, the controller may extract a subsequent text from a writing trace according to the subsequent writing, and may research and display the text and an item that corresponds to the subsequent text on the display.

The display may disperse the at least one item in at least one direction from among upper, lower, left, and right directions of a text display region on which the character is displayed to display the at least one item.

If a first text that indicates a channel zapping function is detected, the controller may display a channel-up item on a first side of a first character display region on which the first character is displayed and may display a channel-down item on a second side that is opposite to the first side, and if a second character that indicates a volume control function is detected, the controller may display a volume-up item on a first side of a second character display region on which the second character is displayed and may display a volume-down item on a second side that is opposite to the first side.

The controller may display the first character display region, the channel-up item, and the channel-down item on a first edge region in a screen of the display, may display the second character display region, the volume-up item, and the volume-down item on a second edge region in the screen of the display, may perform the channel-up or channel-down operation according to the user's operation if the user's operation is performed in a state where the remote controller is rotated in a direction of the first edge region, and may perform volume-up or volume-down operation according to the user's operation if the user's operation is performed in a state where the remote controller is rotated in a direction of the second edge region.

If a character that indicates a color button is detected, the controller may display button items of different colors in at least upper, lower, left, and right directions of the character display region, and if the button item is selected, the controller may perform a function that corresponding to the selection of the button item.

If a character that indicates a content reproduction control function is detected, the controller may display at least one from among a reproduction button item, a rewind button item, a fast forward button item, and a stop button item in at least upper, lower, left, and right directions of the character display region.

If a drag-and-hold operation is input on a touch pad of the remote controller, the controller may successively perform a function that matches an item that corresponds to a drag direction while a hold state is maintained.

The at least one item may include at least one from among an icon, a symbol, a figure, a character, an image, and a photo, and the user's operation may be a touch-and-drag operation or a flick operation.

According to another aspect of the present disclosure, a method for controlling a display apparatus includes receiving a writing trace performed on a remote controller; extracting a character that corresponds to the writing trace; displaying the character and at least one item that corresponds to the character; and if a user's operation is performed in one direction on the remote controller, automatically executing a function that corresponds to the at least one item that is positioned in the direction in which the user's operation is performed.

The executing may include if a subsequent writing is performed on the remote controller, extracting a subsequent character from a writing trace according to the subsequent writing, and researching and displaying the character and an item that corresponds to the subsequent character on the display.

The displaying may include dispersing the at least one item in at least one direction among upper, lower, left, and right directions of a character display region on which the character is displayed to display the at least one item.

The executing may include if a first character that indicates a channel zapping function is detected, displaying a channel-up item on a first side of a first character display region on which the first text is displayed and displaying a channel-down item on a second side of the first text display region that is opposite to the first side; and if a second character that indicates a volume control function is detected, displaying a volume-up item on a first side of a second character display region on which the second character is displayed and displaying a volume-down item on a second side of the second text display region that is opposite to the first side.

The displaying the channel-up and channel-down items may include displaying the first character display region, the channel-up item, and the channel-down item on a first edge region in a screen of the display, and displaying the second character display region, the volume-up item, and the volume-down item on a second edge region in the screen of the display, and the method may further includes if the user's operation is performed in a state where the remote controller is rotated in a direction of the first edge region, performing channel-up or channel-down operation according to the user's operation, and if the user's operation is performed in a state where the remote controller is rotated in a direction of the second edge region, performing volume-up or volume-down operation according to the user's operation.

The executing may include if a character that indicates a color button is detected, displaying button items of different colors in at least upper, lower, left, and right directions of the character display region, and if the button item is selected, performing a function that matches the selected button item.

The executing may include if a character that indicates a content reproduction control function is detected, displaying at least a reproduction button item, a rewind button item, a fast forward button item, and a stop button item in an upper, lower, left, and right directions of the character display region.

The executing may include if a drag-and-hold operation is input on a touch pad of the remote controller, successively performing a function that matches an item that corresponds to a drag direction while a hold state is maintained.

The at least one item may include at least one from among an icon, a symbol, a figure, a character, an image, and a photo, and the user's operation may be a touch-and-drag operation or a flick operation.

According to another aspect of the present disclosure, there is provided a display apparatus comprising: a display configured to display a character that corresponds to a writing trace and at least one item that corresponds to the character; and a controller configured to, if a user's operation is performed in one direction on a remote controller, automatically execute a function that corresponds to the at least one item that is positioned in the direction in which the user's operation is performed.

According to yet another aspect of the present disclosure, there is provided a method for controlling a display apparatus. The method comprises: displaying a character that corresponds to a writing trace and at least one item that corresponds to the character; and if a user's operation is performed in one direction on the remote controller, automatically executing a function that corresponds to the at least one item that is positioned in the direction in which the user's operation is performed.

As described above, according to various embodiments of the present disclosure, a user can easily and intuitively search and use various functions included in a display device.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION OF EXEMPLARY EMBODIMENTS

Hereinafter, exemplary embodiments of the present disclosure are described in detail with reference to the accompanying drawings.

Figure 1:
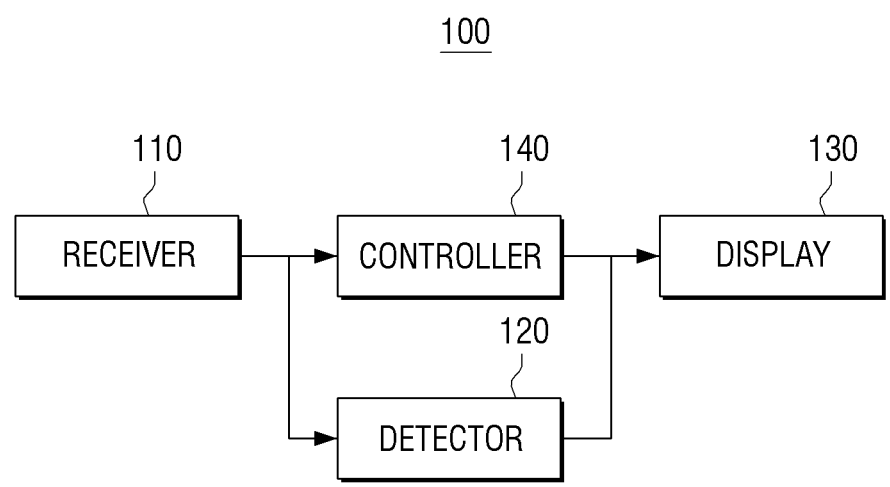
FIG. 1 is an exemplary block diagram of a display apparatus according to an exemplary embodiment of the present disclosure.

FIG. 1 is an exemplary block diagram of a display apparatus 100 according to an embodiment of the present disclosure. Referring to FIG. 1, a display apparatus 100 according to an embodiment of the present disclosure includes a receiver 110, a detector 120, a display 130, and a controller 140.

The receiver 110 may receive various kinds of remote control signals from a remote controller. The remote control signals may include various kinds of data, such as a control code and writing trace. For example, a touch pad may be provided on the remote controller, and a user may perform writing on the touch pad. The remote controller transmits the writing trace to the display apparatus 100.

The detector 120 extracts a text that corresponds to the writing trace. That is, the detector 120 is connected to the receiver 110, and the writing trace that is received through the receiver 110 is provided to the detector 120. The detector 120 may extract a text that corresponds to the writing trace. In this case, the detector 120 may extract the text that corresponds to trace information that is most similar to information on the writing trace through comparison of the information on the writing trace that is performed on the touch pad 210 with a trace of a pre-stored text.

For example, if a user draws "C" on the touch pad 210, the remote controller 200 transmits a remote control signal that corresponds to "C" to the receiver 110. The receiver 110 receives and transmits the remote control signal that corresponds to "C" to the detector 120. In this case, the receiver 110 may transmit the remote control signal itself that corresponds to "C" to the detector 120, or may convert the remote control signal that corresponds to "C" into a predetermined data signal and then transmit the converted data signal to the detector 120. Further, the remote control signal that corresponds to "C" or the converted data signal may include information on the writing trace that is drawn on the touch pad 210. Thereafter, the detector 120 may compare the information on the writing trace that is included in the received remote control signal or the converted data signal with information on the trace of a pre-stored text. Accordingly, the detector 120 can extract "C" which is a text corresponding to "C" that is the writing trace drawn on the touch pad 210.

On the other hand, the detector 120 extracts the information on the user's writing trace received from the touch pad 210. Specifically, the detector 120 may analyze coordinate data of the input writing trace. That is, the detector 120 detects the characteristic of the input writing trace through analysis of the coordinate data of the input writing trace, and extracts a text that corresponds to the characteristic. The characteristic may include a length of each stroke that constitutes the writing trace, an angle between the strokes, a shape, and a size of each stroke. The detector 120 may extract the text that corresponds to the writing trace through comparison of feature information of the text, such as a character, a symbol, and a figure stored in the pre-stored database with feature information detected from the writing trace.

As an example, the detector 120 divides the trace measured from a start point of the writing to an end point thereof in units of a predetermined distance, and detects a direction vector of a line that connects between the start point and the end point for each unit distance. The detector 120 calculates the angle between the respective direction vectors and determines the characteristic of the writing trace based on the result of the calculation. For example, if the angles between the direction vectors that correspond to respective unit distances are equal to or similar to each other within a predetermined range, the detector 120 determines the whole trace as a straight line.

In contrast, if there is a portion where the difference between the angles exceeds a predetermined value, it may be determined that the writing trace is bent at the portion. The detector 120 may determine the whole trace as a curve if the number of bent portions where the writing trace is bent exceeds a preset number.

Further, if the writing trace has an overlapping portion, the detector 120 recognizes that a closed curve occurs at the portion. The detector 120 can detect the characteristic information of the user's writing trace based on whether the curve is a closed curve, the bending angle of the line, and the number of bent portions. The detector 120 may detect which text the user's writing trace means through comparison of the characteristic information with pre-stored text information.

The writing trace extracted in this manner may be transmitted to the display 130 to be displayed on the display 130 by the controller 140 connected to the detector 120.

Further, if another writing trace is input within a predetermined time, the detector 120 determines whether the writing trace corresponds to a straight line or a curve through analysis of the coordinate data thereof as described above. The display 130 may display the other writing trace input within the predetermined time in addition to the writing trace that is previously input and displayed.

As described above, the detector 120 may extract the entire text through combination of at least one trace input within the predetermined time. The detector 120 may transmit the text extracted in this manner to the display 130. The display 130 may display the text that is transmitted from the detector 120. The controller 140 may search items according to the text that is transmitted from the detector 120.

The display 130 displays the text that is detected by the detector 120 and at least one item that corresponds to the text. As described above, since the detector 120 detects the text that corresponds to the writing trace drawn on the touch pad 210 of the remote controller 200, the display 130 that is connected to the detector 120 can display the text that is detected by the detector 120. Further, the display apparatus 100 may display at least one item that corresponds to the text. In this case, the display apparatus 100 may pre-store the text and at least one item that corresponds to the text.

For example, a main item that corresponds to "C" that is the detected text may be "Channel", or "Color button", and such a main item may include sub-items. That is, the main item "Channel" is an item that performs a channel zapping function, and its sub-items may include a "channel-up item" for increasing a channel number and outputting a corresponding broadcast and a "channel-down item" for decreasing a channel number and outputting a corresponding broadcast. Further, the main item "Color button" is an item for performing a function that corresponds to a color button, and its sub-items may be a plurality of "color items" each of which corresponds to one color. This will be described in detail with reference to FIG. 2.

On the other hand, if a subsequent writing is performed on the remote controller 200, the detector 120 may extract a subsequent text from the writing trace according to the subsequent writing. If the subsequent text is extracted, the controller may research an item that corresponds to the subsequent text and may display the research result through the display 130.

A process of extracting a subsequent text according to the subsequent writing and a process of researching and displaying an item that corresponds to the extracted subsequent text are the same as those as described above. However, in the previous example, it is assumed that "H" is extracted as a subsequent text to "C" that is the previously extracted text. In this case, since the previously displayed items are "Channel" and "Color button" and "H" is extracted as the subsequent text, the item "Color button" is not displayed, but only the item "Channel" may be displayed. Accordingly, on the display 130, the finally extracted text "H", the main item "Channel", and the sub-items "Channel-up item" and "Channel-down item" which are the sub-items of the main item may be displayed.

The controller 140 may control the operations of the receiver 110, the detector 120, and the display 130 as described above. In particular, if a user's operation is performed in one direction on the remote controller 200, the controller 140 may operate to automatically execute a function corresponding to an item that is positioned in a direction in which the user's operation is performed. That is, a user can execute an item on a display that is positioned in a direction where the item having a function of which execution is desired is positioned, by moving a cursor on a screen of the remote controller on which the cursor is currently positioned toward the direction of the item having the function of which the execution is desired and then by performing only an operation, such as a drag, flick, or swipe, on the screen on which the cursor is currently positioned in the direction in which the item having the function of which the execution is desired. The above operations can be performed without the necessity of performing a selection operation, such as click or touch. In this case, the display 130 may display a text display region for displaying a text, and may disperse and display at least one item in at least one of upper, lower, left, and right directions of the text display region.

On the other hand, the item may include at least one of an icon, a symbol, a figure, a character, an image, and a photo. That is, the item that a user can intuitively understand may be displayed, and each of a plurality of sub-items for one main item may include one of a different icon, symbol, figure, character, image, and photo.

As described above, the user's operation may be a touch-and-drag operation or a flick operation.

FIGS. 2 to 7 are exemplary diagrams of screens of a display device 100 according to various exemplary embodiments of the present disclosure. Hereinafter, referring to FIGS. 2 to 7, respective exemplary embodiments will be successively described, and description of duplicate portions to the portions as described above will be omitted.

As described above, the touch pad 210 is provided on the remote controller 200, and a user can write various kinds of symbols, figures, and characters on the touch pad 210. The user's writing that is performed on the touch pad 210 is in the form of a trace, and such writing trace may be converted into a remote control signal to be transmitted from the remote controller 200 to the receiver 110. Accordingly, the receiver 110 can receive the user's writing trace that is performed on the touch pad 210 of the remote controller 200.

Figure 2:
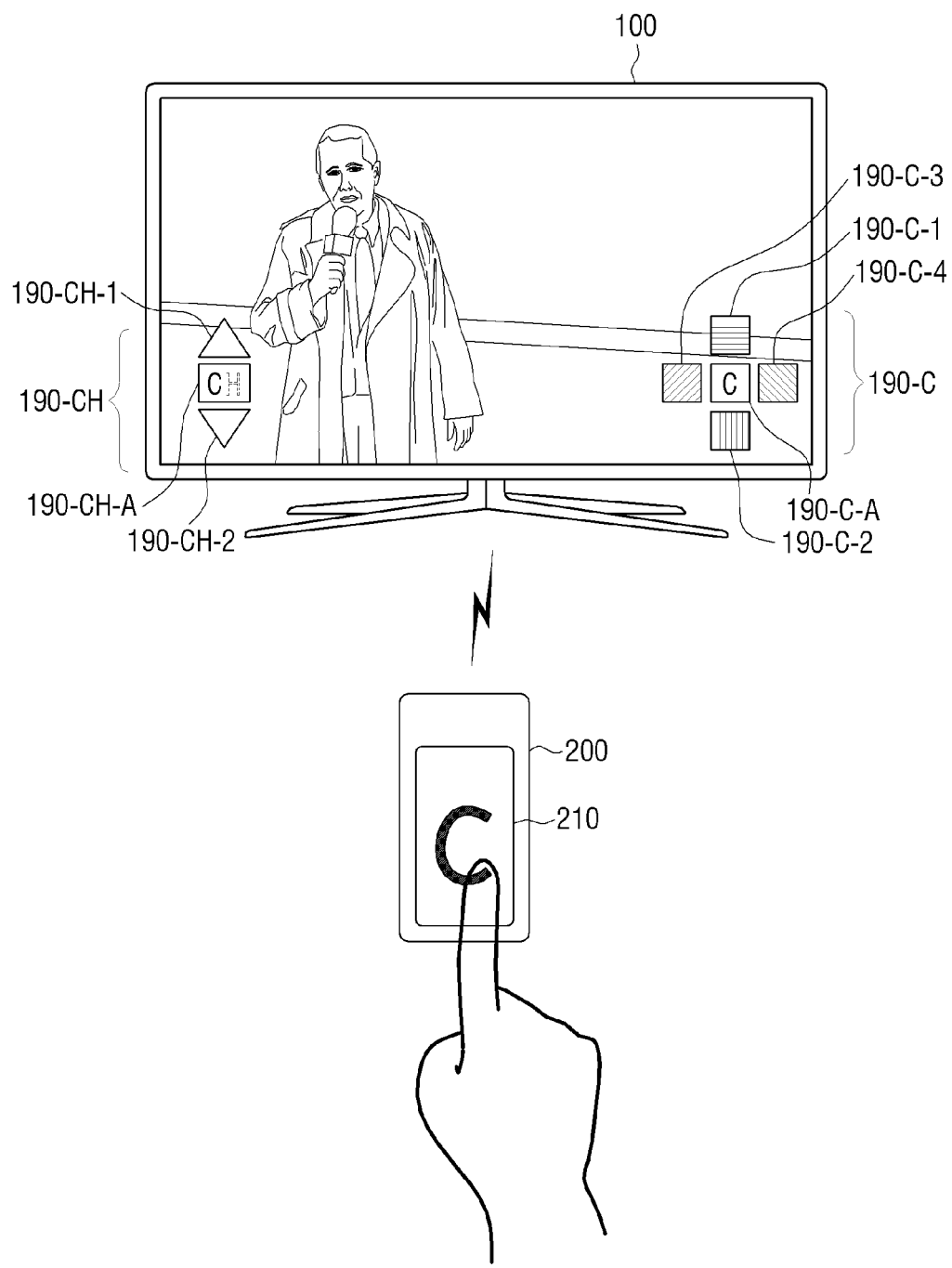
FIGS. 2 to 7 are exemplary diagrams of screens of a display device according to various exemplary embodiments of the present disclosure.

As illustrated in FIG. 2, the user may input the writing on the touch pad 210 of the remote controller 200. For example, if the user draws a character "C" on the touch pad 210, the remote controller 200 transmits a remote control signal that corresponds to "C" to the display apparatus 100. The display apparatus 100 that has received the remote control signal that corresponds to "C" may extract a text that corresponds to "C" and may display the extracted text on the text display region.

Here, it is assumed that the display apparatus 100 stores channel button items for executing the channel zapping function as main items having titles including the text "C" and color button items for executing functions corresponding to respective color buttons. Accordingly, a channel button region 190-CH and a color button region 190-C may be formed on the screen of the display 130.

As illustrated in FIG. 2, a text display region 190-CH-A of the channel button region 190-CH may be formed on the channel button region 190-CH, and a first channel item 190-CH-1 and a second channel item 190-CH-2 may be respectively displayed in upper and lower directions of the text display region 190-CH-A of the channel button region 190-CH. Here, a text that is extracted by the detector 120 may be displayed on the text display region 190-CH-A of the channel button region 190-CH.

If another text that is connected to the detected text exists, the controller 140 may display the other text in the form of a dotted line to guide the user's subsequent writing. Referring to FIG. 2, the text "C" is displayed in the form of a solid line and the text "H" is displayed in the form of a dotted line. The text that is displayed in the form of a solid line may mean the text that is extracted by the detector 120 through the remote control signal. The text that is displayed in the form of a dotted line is not a text that is detected by the remote control signal, but is to inform a user in advance of the title of the corresponding item so as to guide the user's input of a subsequent writing trace or the user's selection. It is described that the text is displayed in the form of a solid line and a dotted line, but is not limited thereto. That is, a pre-input text and a non-input text may be differently displayed according to predetermined pixel levels, by pre-determined colors, or according to addition states of a text size, thickness, contrast, and other various emphasized displays.

If a user selects the channel button region 190-CH or inputs a writing trace corresponding to a subsequent text "H" in a state where the channel button region 190-CH and the color button region 190-C are simultaneously formed as shown in FIG. 2, a first text for executing the channel zapping function is detected, and the first channel item 190-CH-1 and the second channel item 190-CH-2 are displayed in the upper and lower directions of the text display region 190-CH-A of the channel button region 190-CH. In this case, the first channel item 190-CH-1 may be a channel-up item for outputting a broadcasting signal for a channel number that is arrived at by successively increasing the currently output channel number. The second channel item 190-CH-2 may be a channel-down item for outputting a broadcasting signal for a channel number that is arrived at by successively decreasing the currently output channel number.

If the user selects the channel-up item or the channel-down item when the broadcasting signal for a specific channel is being output, the display apparatus 100 may output the broadcasting signal for the channel number that is increased or decreased according to the function of the selected item.

On the other hand, as illustrated in FIG. 2, a text display region 190-C-A of the color button region 190-C may be formed on the color button region 190-C, and a first color item 190-C-1, a second color item 190-C-2, a third color item 190-C-3, and a fourth color item 190-C-4 may be displayed in the upper, lower, left, and right directions of the text display region 190-C-A of the color button region 190-C. Here, a text that is extracted by the detector 120 may be displayed on the text display region 190-C-A of the color button region 190-C.

If the user selects the color button region 190-C in a state where the channel button region 190-CH and the color button region 190-C are simultaneously formed as shown in FIG. 2, the channel button region 190-CH may disappear. In this case, the first color item 190-C-1 may be red, the second color item 190-C-2 may be green, the third color item 190-C-3 may be blue, and the fourth color item 190-C-4 may be yellow. Accordingly, the user can select one of the four color buttons that corresponds to the color item matching the function to be executed.

As described above, items for the four color buttons are exemplified, but are not limited thereto. In general, the remote controller 200 in the related art has four color buttons to enable a user to use only the limited number of color buttons, but the remote controller 200 according to an exemplary embodiment of the present disclosure is not limited thereto. That is, the display apparatus 100 may set functions that correspond to four or more color buttons, and items that correspond to four or more color buttons may be displayed in various directions around the text display region 190-C-A of the color button region 190-C.

Further, means for executing a function that matches a selected one of items will be described later.

Figure 3:
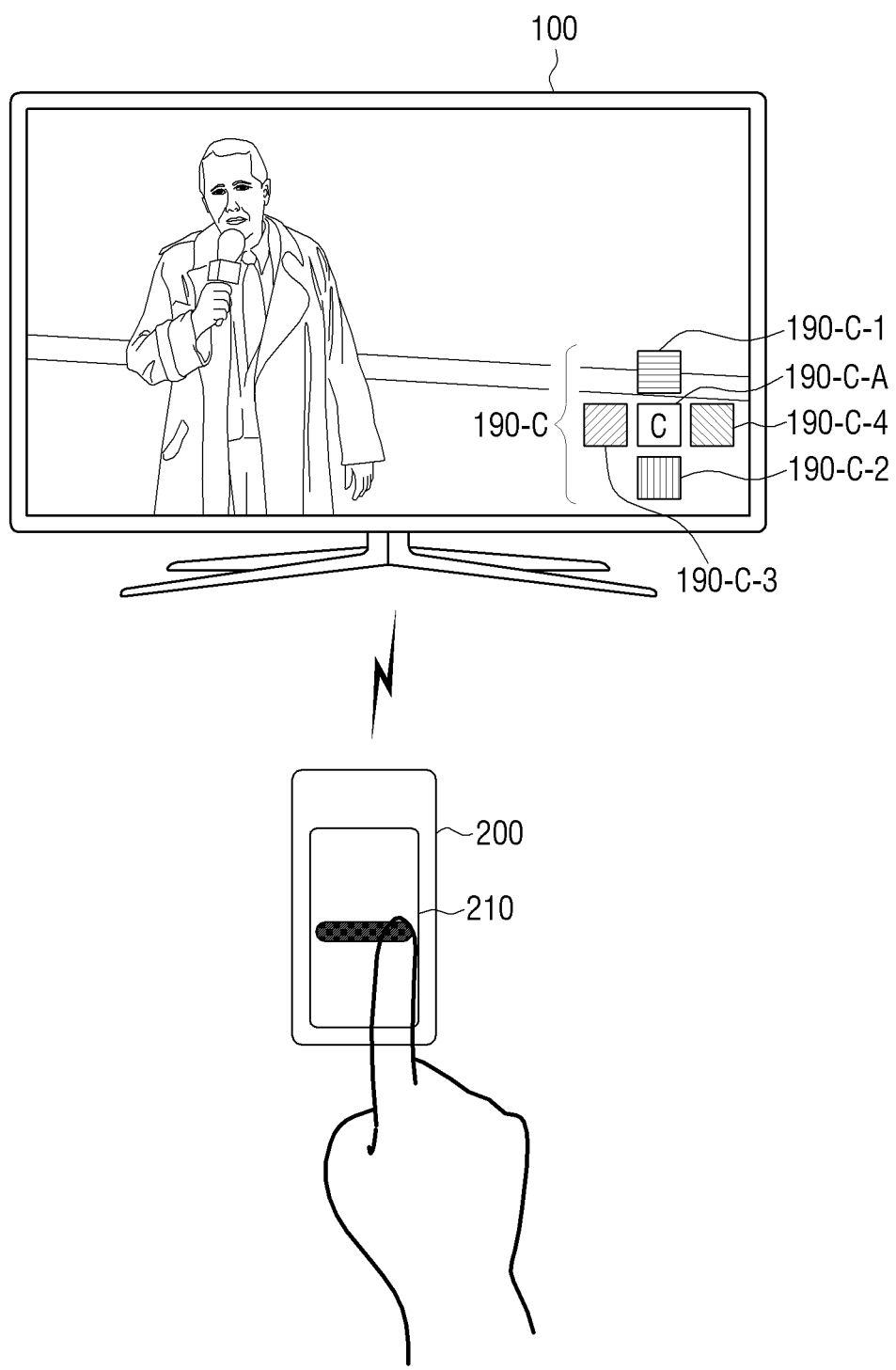

FIG. 3 is a diagram explaining a control method according to still another exemplary embodiment.

Referring to FIG. 3, if the user draws "C", the controller 140 displays items related to the text "C" that is drawn by the user on the screen. As illustrated in FIG. 3, "C" is displayed on the text display region 190-C-A, and color button items having different colors are displayed on upper, lower, left, and right sides of the text display region 190-C-A. As described above, the text display region 190-C-A is displayed on the color button region 190-C, and the first color item 190-C-1, the second color item 190-C-2, the third color item 190-C-3, and the fourth color item 190-C-4 are displayed in the upper, lower, left, and right directions around the text display region 190-C-A of the color button region 190-C.

In this state, the user may select respective items using the touch pad of the remote controller 200. For example, as illustrated in FIG. 3, the user may perform a touch and drag or flick operation in the rightward direction on the touch pad 210. In this case, the controller 140 recognizes that the item 190-C-4 that is positioned on the right based on the text display region 190-C-A is selected, and automatically executes the function that corresponds to the item.

Figure 4:
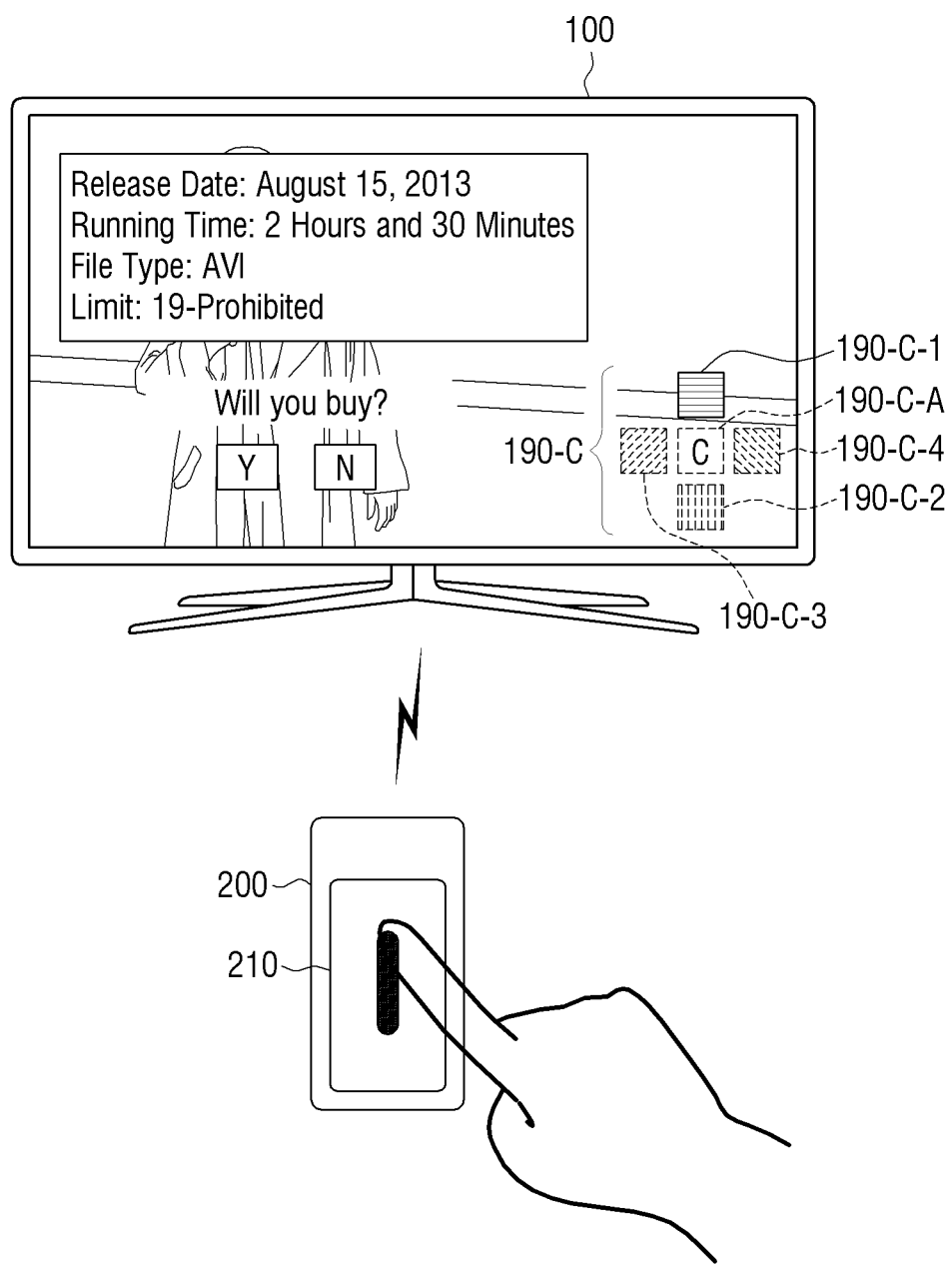

FIG. 4 shows a case where the user performs a touch-and-drag or flick operation in the upward direction. If the user performs touch-and-drag operation in the upward direction, the cursor that is displayed on the text display region 190-C-A moves to the first color item 190-C-1 that is arranged on the upper side of the text display region 190-C-A, and the controller 140 automatically executes the function that matches the first color item 190-C-1. In other word, it is not necessary to separately input a command, such as "select" or "enter" after the cursor is positioned on the corresponding item, and thus the user can control the display apparatus 100 simply and intuitively.

Although FIGS. 3 and 4 exemplify a case where the text "C" is written, the user may write various texts. The controller 140 may selectively display the item that corresponds to the text that is written by the user. For example, if the user writes a text "M", the text "M" is displayed in the text display region, and items related to "M" are displayed on the upper, lower, left, and right sides of the text. If it is assumed that "M" is a text that means a content reproduction control function, a "play" button item, a "rewind" button item, a "fast-forward" button item, and a "stop" button item, which are related to the content reproduction function, may be displayed on the upper, lower, left, and right sides of the text display region.

Further, if the user writes a first text that means a channel zapping function, for example, a text "CH", the controller 140 may display the first text, display a channel-up item on a first side of the text display region, and display a channel-down item on a second side that is opposite to the first side.

Further, if the user writes a second text that means a volume control function, for example, a text "V", the controller 140 may display the second text, display a volume-up item on the first side of the text display region, and display a volume-down item on the second side of the text display region that is opposite to the first side.

That is, the controller 140 may change the direction in which the item is displayed in various ways according to the number of items.

Although FIGS. 3 and 4 exemplify a case where the text and the item are displayed on an edge side of the screen, it is also possible to display the text and the item in the center region of the screen.

According to still another exemplary embodiment of the present disclosure, the embodiment that is described with reference to FIGS. 3 and 4 may be implemented with the exemplary embodiment as described above with reference to FIG. 2. That is, if a plurality of functions correspond to the text that is written by the user, the respective items and the items corresponding to the texts may be displayed in different regions of the screen as shown in FIG. 2. FIG. 2 illustrates a state where a channel button item including the text "C" and a color button item are displayed on the left and right sides of the screen. In this state, the user may select one text by performing dragging or flicking in the rightward or leftward direction on the touch pad. For example, if the right side is selected, the controller 140 may delete the channel button region 190-CH that is formed on the left region of the display 130, and as illustrated in FIG. 3, may display only the color button region 190-C that is formed on the right region of the display 130. In this state, the user may execute a function that corresponds to the item by selecting one item according to a user's subsequent operation.

In the above-described exemplary embodiments, it is exemplified that respective items are dispersed and arranged in at least one region in the upper, lower, left, or right direction based on the text display region. However, the items may be dispersed and arranged in various directions.

Figure 5:
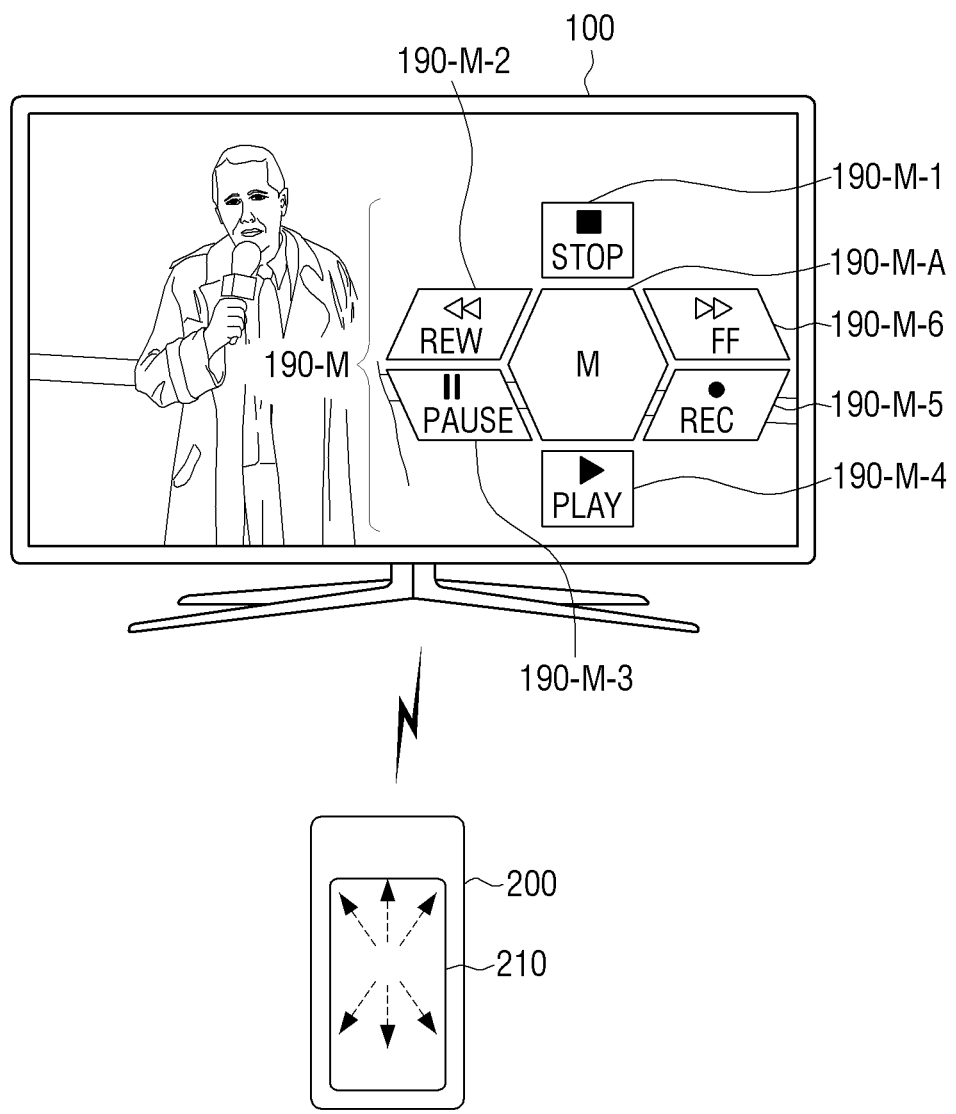

FIG. 5 illustrates a display screen according to another exemplary embodiment of the present disclosure.

Referring to FIG. 5, the remote controller 200 transmits a signal that corresponds to the writing trace "M" that is drawn by the user, to the display apparatus 100. Accordingly, the display apparatus 100 extracts the text "M", and a corresponding media button region 190-M-A is formed on the screen of the display 130. The text display region 190-M-A of the media button region 190-M is formed on one side of the display screen, and first to sixth media items may be displayed around the text display region 190-M-A of the media button region 190-M.

In this case, the first to sixth media items may include symbols and/or characters so that the user can intuitively recognize the functions of the corresponding items.

The first to sixth media items may be items for controlling the display operation of content that is currently output. The first media item performs a "stop" function to turn off the output of the content. The second media item performs a "rewind" function to rewind the content. The third media item performs a "pause" function to stop reproduction of the content. The fourth media item performs a "play" function to reproduce again the content that is in an off or stopped state. The fifth media item performs a "record" function to record the content being output. The sixth media item performs "fast-forward" function to quickly reproduce the content in a forward direction.

The kind and the arrangement of the items are not limited to those as illustrated in FIG. 5. That is, it is also possible to display the "play" item, the "rewind" item, the "fast-forward" item, and the "stop" item on the upper, lower, left, and right sides around the text display region 190-M-A of the media button region 190-M.

On the other hand, in a state where the first to sixth media items are displayed on the screen of the display 130, the user may perform a touch-and-drag operation on the touch pad 210 to select one item. The touch-and-drag operation is the same as that as described above. However, in the case where a plurality of items are displayed in the method as illustrated in FIG. 5, the user may select and execute the corresponding item by performing a touch-and-drag operation in the direction that corresponds to the position where the respective items are arranged. For example, if it is intended to execute the sixth media item, the user may perform the touch-and-drag operation in the direction of 1 o'clock or 2 o'clock on the touch pad 210 of the remote controller 200. That is, a plurality of items may be displayed to form the same angle based on the text display region. Accordingly, the user can perform the touch-and-drag operation on the touch pad 210 in the same direction as the direction in which the item that is intended to be executed is positioned.

As described above, if there are a large number of items, the respective items may be dispersed and arranged at various angles based on the text display region.

Figure 6:
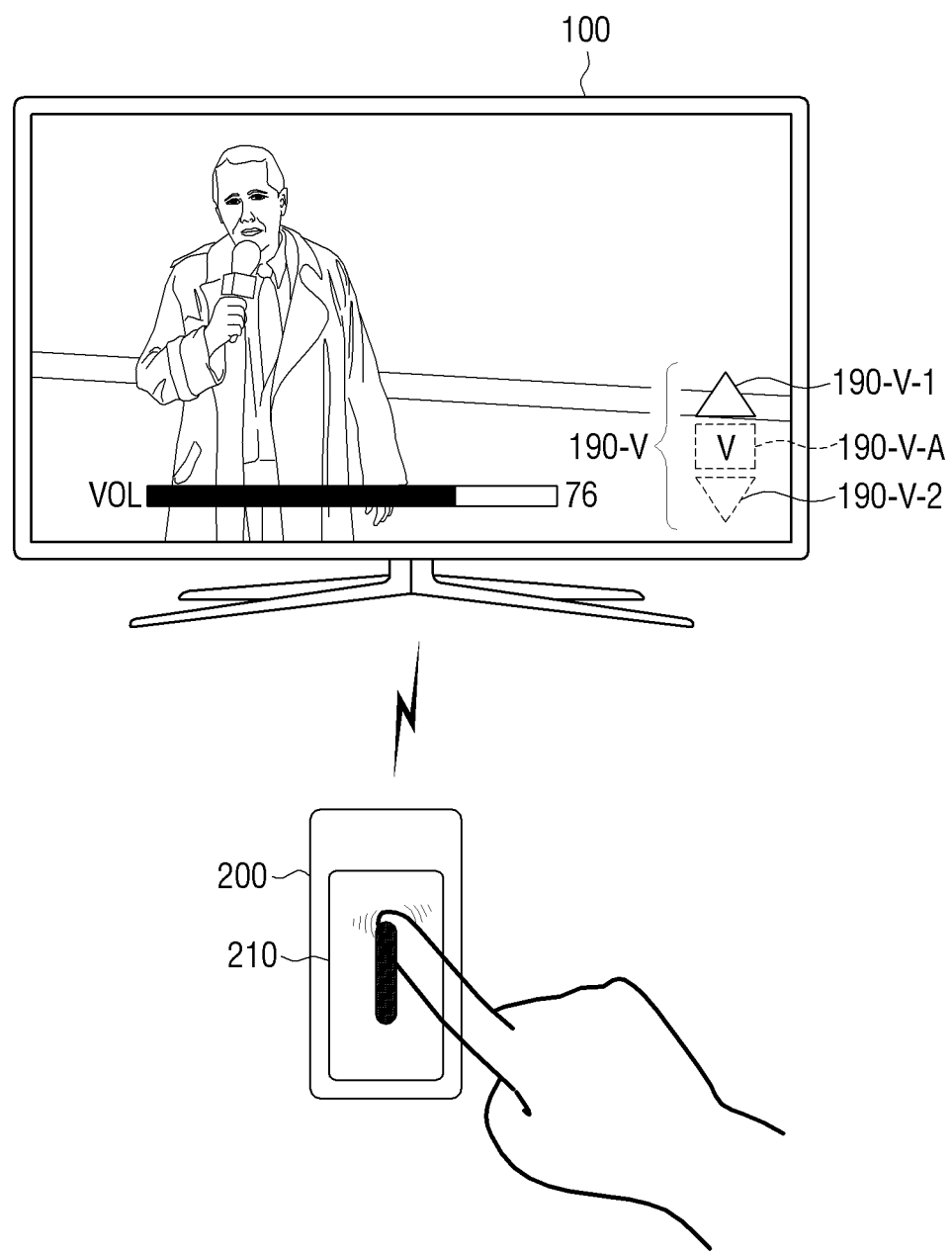

FIG. 6 illustrates a display screen according to still another exemplary embodiment of the present disclosure.

As illustrated in FIG. 6, the remote controller 200 transmits a signal that corresponds to the writing trace "V" that is drawn by the user to the display apparatus 100. Accordingly, the display apparatus 100 extracts the text "V", and a corresponding volume button region 190-V is formed on the screen of the display 130. Once a text display region 190-V-A of a volume button 190-V is formed on one side of the display screen, a first volume item 190-V-1 and a second volume item 190-V-2 may be displayed on the upper side and the lower side of the text display region 190-V-A of the volume button region 190-V. Here, the first volume item 190-V-1 may be a volume-up item to increase a volume of the currently output content, and the second volume item 190-V-2 may be a volume-down item to decrease the volume of the currently output content.

Referring to FIG. 6, the user performs a drag-and-hold operation in the upward direction on the touch pad 210. The drag-and-hold operation may be an operation to hold the last operation of the touch-and-drag operation. In this case, the drag-and-hold operation may be the same as selection of the function that corresponds to the selected item several times. Accordingly, as illustrated in FIG. 6, if the user performs the drag-and-hold operation in the upward direction on the touch pad 210, the cursor moves from the text display region 190-V-A of the volume button region 190-V to the volume-up item to simultaneously perform volume-up function. Here, since the user performs the drag-and-hold operation, the same function as the selection of the volume-up button plural times may be performed. Accordingly, while the user maintains the drag-and-hold operation, the volume level of the output content can be continuously increased.

Figure 7:
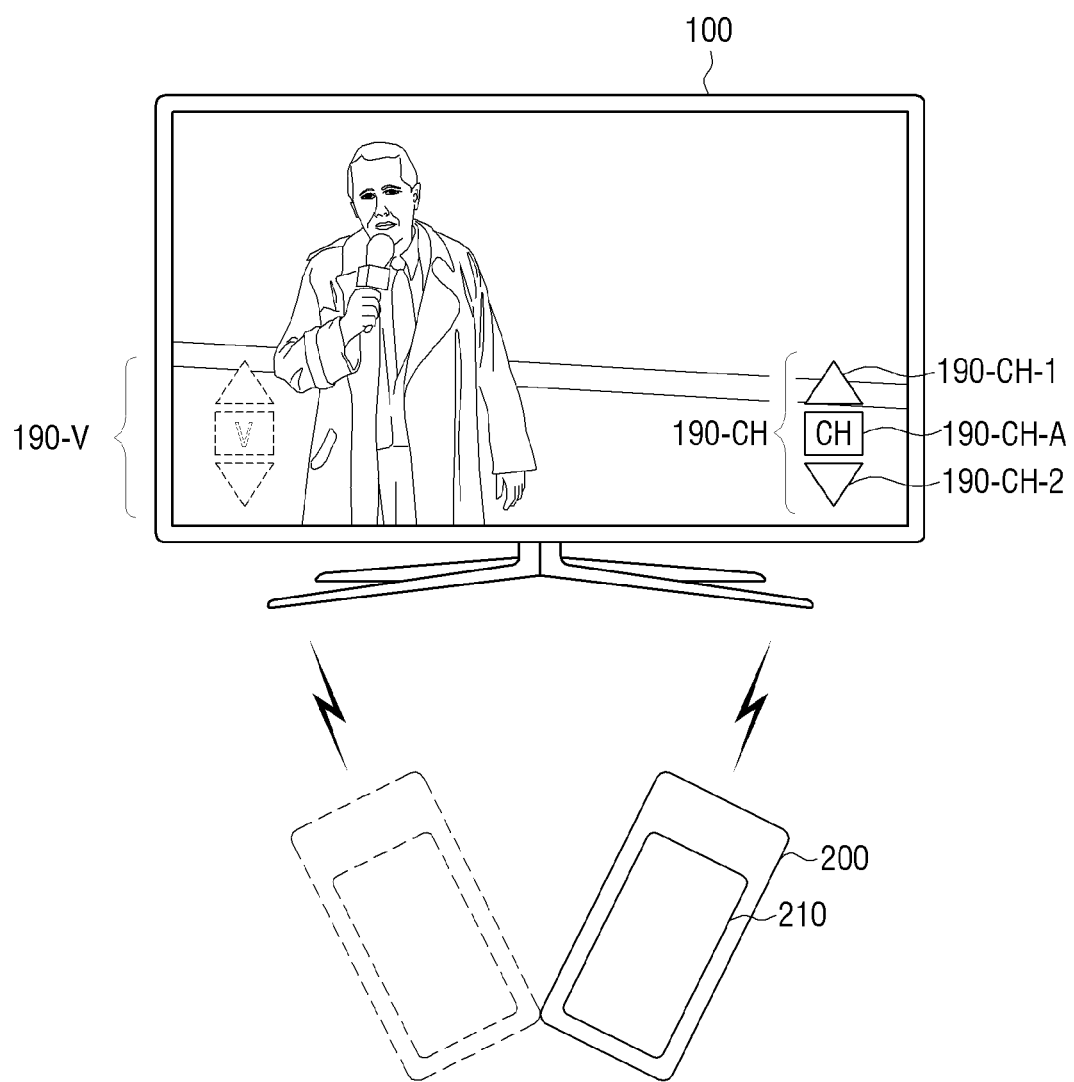

FIG. 7 illustrates a display screen according to still another embodiment of the present disclosure.

As illustrated in FIG. 7, if a first text that means a channel zapping function is detected, the controller 140 may display a channel-up item on the first side of the first text display region and may display a channel-down item on the second side that is opposite to the first side. If a second text that means a volume control function is detected, the controller may display a volume-up item on the first side of the second text display region, and may display a volume-down item on the second side that is opposite to the first side.

On the other hand, items that are frequently used by the user may be displayed on the screen of the display 130. For example, it is assumed that the user frequently uses an item for the volume increase/decrease function and an item for a channel zapping function in a state where the display apparatus 100 outputs a TV broadcast. In this case, the user may set to form a volume button region 190-V on one side of the screen of the display 130 and to form a channel button region 190-CH on the other side thereof. Accordingly, it is not necessary for the user to input drawing on the touch pad 210 one by one to display items that correspond to the functions desired by the user.

On the other hand, an acceleration sensor or a geomagnetic sensor may be built in the remote controller 200. If the acceleration sensor is built in, it can sense the inclination (pitch angle, roll angle, and yaw angle) of the remote controller 200. Specifically, if the acceleration sensor is built in the remote controller 200, X, Y, and Z axes are determined, which cross each other along the arrangement direction of each axis flex gate. The pitch angle means a rotating angle that is measured when the remote controller is rotated about the Y axis, and the roll angle means a rotating angle that is measured when the remote controller is rotated about the X axis. The yaw angle means a rotating angle that is measured when the remote controller is rotated about the Z axis. The pitch angle and the roll angle may be measured by the acceleration sensor, and the yaw angle may be measured by the geomagnetic sensor or a gyro sensor. The remote controller 200 senses the change of the pitch angle, the roll angle, and the yaw angle using the acceleration sensor, the geomagnetic sensor, or the gyro sensor, and transmits the results of the sensing to the display apparatus 100. The controller 140 may determine an interaction mode through comparison of the sensing results with preset threshold conditions.

Accordingly, as illustrated in FIG. 7, if the user rotates the remote controller 200 in the right direction in which the channel button region 190-CH is formed, the channel button region 190-CH may be selected by the acceleration sensor, the geomagnetic sensor, or the gyro sensor built in the remote controller 200. Thereafter, if the user performs a touch-and-drag operation in the upward direction on the touch pad 210, a broadcasting signal that corresponds to the increased channel number may be output. In the same manner, if the user rotates the remote controller 200 in the leftward direction in which the volume button region 190-V is formed, the volume button region 190-V may be selected by the acceleration sensor, the geomagnetic sensor, or the gyro sensor built in the remote controller 200. Accordingly, the user can simply select a button region that is intended to be executed among a plurality of button regions through changing of the direction of the remote controller 200.

Figure 8:
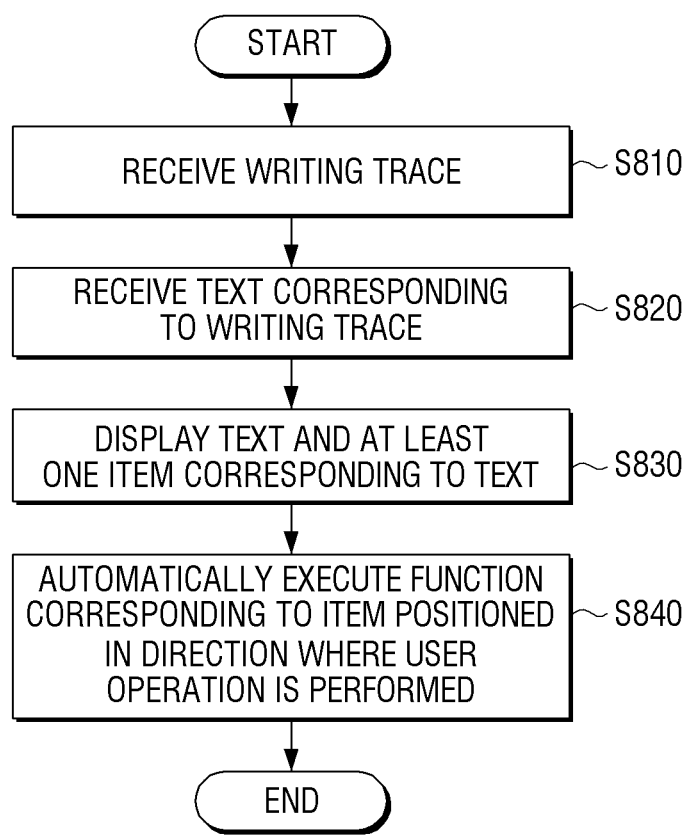
FIG. 8 is an exemplary flowchart illustrating a method for controlling a display apparatus according to an exemplary embodiment of the present disclosure.

FIG. 8 is an exemplary flowchart illustrating a method for controlling a display apparatus according to an exemplary embodiment of the present disclosure. Description of duplicate portions as already described above will be omitted.

First, the user performs writing on the touch pad of the remote controller 200 in a state where the remote controller 200 is directed to the display apparatus 100. The user's writing is converted into a remote control signal to be transmitted to the display apparatus 100. Accordingly, the display apparatus 100 receives the writing trace that is performed on the touch pad of the remote controller 200 (S810).

Thereafter, the display apparatus 100 extracts a text that corresponds to the writing trace (S820). In this case, the display apparatus 100 may extract the text that corresponds to trace information that is most similar to information on the writing trace through comparison of the information on the writing trace that is performed on the touch pad 210 with a trace of a pre-stored text.

Then, the display apparatus 100 displays the text and at least one item that corresponds to the text (S830). That is, the display apparatus 100 displays the extracted text and simultaneously displays at least one item that corresponds to the extracted text. In this case, the display apparatus 100 may pre-store the text and at least one item that corresponds to the text.

Further, a subsequent writing may be performed on the remote controller 200. The order of extracting a text that corresponds to the subsequent writing that is performed on the remote controller 200 and the order of displaying at least one item that corresponds to the extracted text are the same as those as described above.

Thereafter, if a user's operation is performed in one direction on the remote controller 200, the display apparatus 100 automatically executes a function corresponding to an item that is positioned in a direction in which the user's operation is performed (S840). That is, the display apparatus 100 can arrange and display at least one item in various directions based on one center region. The user can perform a touch-and-drag operation on the touch pad in the same direction as the direction in which the item that is intended to be selected is formed. Accordingly, the display apparatus 100 can select an item that is formed and displayed in the same direction as the direction in which the touch-and-drag operation is performed simultaneously by automatically executing the item.

Figure 9:
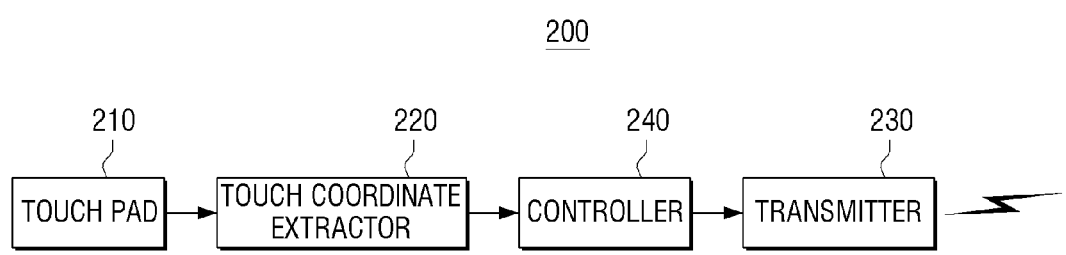
FIG. 9 is an exemplary block diagram of a remote controller according to an exemplary embodiment of the present disclosure.

FIG. 9 is an exemplary block diagram of a remote controller 200 according to an exemplary embodiment of the present disclosure.

Referring to FIG. 9, a remote controller 200 according to an exemplary embodiment of the present disclosure includes a touch pad 210, a touch coordinate extractor 220, a controller 240, and a transmitter 230.

The touch pad 210 inputs writing that is drawn by the user. That is, the touch pad 210 inputs the trace of the user's writing, and the input writing trace is transmitted to the touch coordinate extractor 220.

The touch coordinate extractor 220 extracts information on the user's writing trace that is received from the touch pad 210. Specifically, the touch coordinate extractor 220 may extract coordinate data of the input writing trace. That is, the touch coordinate extractor 220 may extract the coordinate data of the input writing trace to transmit the extracted coordinate data to the transmitter 230. On the other hand, the controller 240 may control the whole operation of the touch pad 210, the touch coordinate extractor 220, and the transmitter 230.

As described above, the touch coordinate extractor 220 may extract the coordinate data of the input writing trace. The controller 240 may transmit the extracted coordinate data to the transmitter 230, and the transmitter 230 may transmit the coordinate data to the display apparatus. Accordingly, the display apparatus that has received the coordinate data of the writing trace may extract a text using the received coordinate data. Since the explanation of the text extraction of the display apparatus is the same as the explanation of that as described above with reference to FIG. 1, the detailed description thereof will be omitted.

Figure 10:
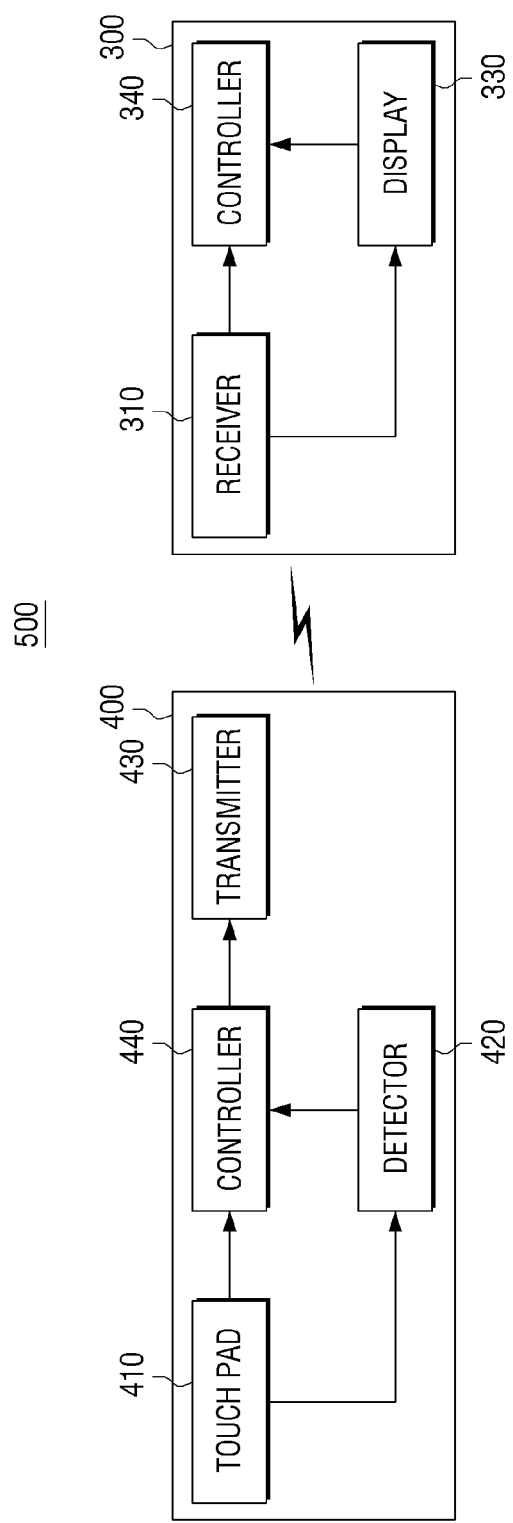
FIG. 10 is an exemplary block diagram of a communication system including a remote controller and a display device according to another exemplary embodiment of the present disclosure.

FIG. 10 is an exemplary block diagram of a communication system 500 including a remote controller 400 and a display device 300 according to another exemplary embodiment of the present disclosure. Hereinafter, explanation will be made regarding aspects that are different from the aspects described above with reference to FIG. 9.

Referring to FIG. 10, in a communication system 500 according to another exemplary embodiment of the present disclosure, a remote controller 400 includes a touch pad 410, a detector 420, a transmitter 430, and a controller 440, and a display apparatus 300 includes a receiver 310, a display 330, and a controller 340.

The detector 420 may extract information on the user's writing trace that is received from the touch pad 410. Specifically, the detector 420 may analyze coordinate data of the input writing trace. That is, the detector 420 detects the characteristic of the input writing trace through analysis of the coordinate data of the input writing trace, and extracts a text that corresponds to the characteristic. The detector 420 may analyze the writing trace in various ways.

As an example, the detector 420 divides the trace measured from a start point of the writing to an end point thereof in units of a predetermined distance, and detects a direction vector of a line that connects between the start point and the end point for each unit distance. The detector 420 calculates an angle between respective direction vectors and determines the characteristic of the writing trace based on the result of the calculation. For example, if the angles between the direction vectors that correspond to respective unit distances are equal to or similar to each other within a predetermined range, the detector 420 determines the whole trace as a straight line.

In contrast, if there is a portion where the difference between the angles exceeds a predetermined value, it may be determined that the writing trace is bent at the portion. The detector 420 may determine the whole trace as a curve if the number of bent portions where the writing trace is bent exceeds a preset number.

Further, if the writing trace has an overlapping portion, the detector 420 recognizes that a closed curve occurs at the portion. The detector 420 can detect the characteristic information of the user's writing trace based on whether the curve is a closed curve, the bending angle of the line, and the number of bent portions. The detector 420 may detect which text the user's writing trace means through comparison of the characteristic information with pre-stored text information.

The writing trace extracted in this manner may be transmitted to the transmitter 430 by the controller 440 connected to the detector 420, and the transmitter 430 may transmit the extracted writing trace to the receiver 310 of the display apparatus 300. The receiver 310 may transmit the extracted writing trace to the controller, and the display 330 may display the text that is transmitted from the controller 340.

Figure 11:
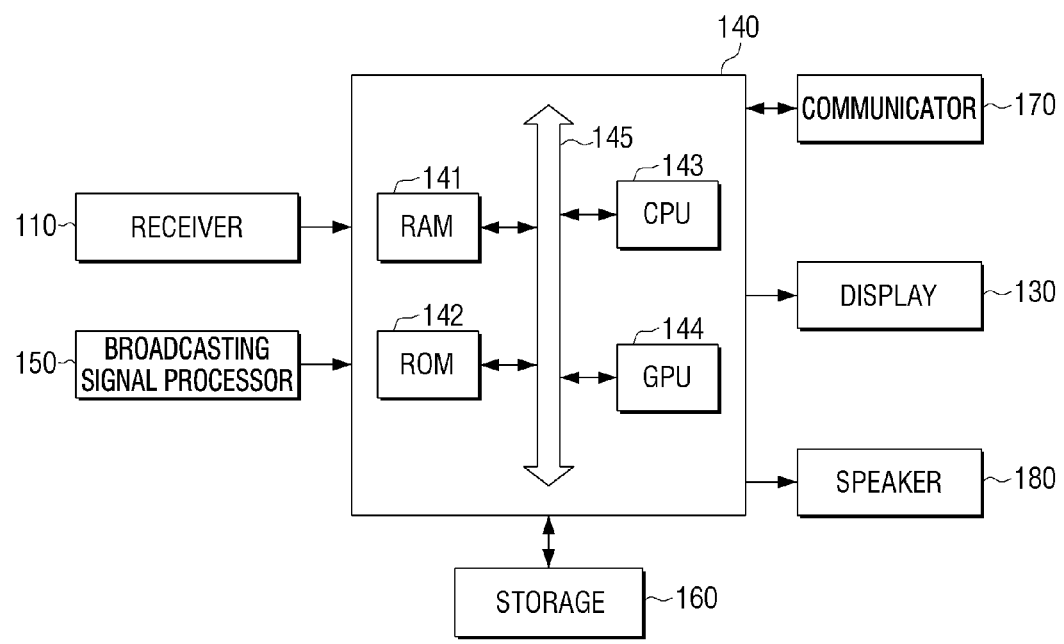
FIG. 11 is an exemplary block diagram explaining the detailed configuration of a display device according to an exemplary embodiment of the present disclosure.

FIG. 11 is an exemplary block diagram explaining the detailed configuration of a display device according to an exemplary embodiment of the present disclosure.

As illustrated in FIG. 11, a display apparatus according to an exemplary embodiment of the present disclosure includes a receiver 110, a broadcasting signal processor 150, a controller 140, a storage 160, a communicator 170, a display 130, and a speaker 180.

The receiver 110 may receive a remote control signal that is transmitted from an external remote controller and may transmit the received remote control signal to the controller 140. In this case, the receiver 110 may be formed in a certain region, such as a front portion, a side portion, or a rear portion, outside of the main body of the display apparatus.

The storage 160 may be a constituent element for storing various kinds of programs and data required for the operation of the display apparatus. In particular, the storage 160 may store information on text traces and at least one item corresponding to the text. Accordingly, the information on the writing trace received from the remote controller may be compared with the information on the text trace stored in the storage 160. Further, at least one item that corresponds to the extracted text may be extracted from the storage 160.

The display 130 displays various screens as described above. The display 130 may be implemented by various types of displays, such as a Liquid Crystal Display (LCD), an Organic Light Emitting Diodes (OLED) display, and a Plasma Display Panel (PDP). In the display 130, a driving circuit that may be implemented in the form of an a-si thin-film-transistor (TFT), a Low Temperature Poly Silicon (LTPS) TFT, and an Organic TFT (OTFT), and a backlight unit may be included.

The controller 140 controls the whole operation of the display apparatus. The controller 140 includes a random access memory (RAM) 141, a read-only memory (ROM) 142, a central processing unit (CPU) 143, a graphics processing unit (GPU) 144, and a bus 145. The RAM 141, ROM 142, CPU 143, and GPU 144 may be connected to each other through the bus 145.

The CPU 143 accesses the storage 160, and performs booting using an O/S stored in the storage 160. Further, the CPU 143 performs various operations using various kinds of programs, content, and data stored in the storage 160. Further, the CPU 143 analyzes the writing trace and extracts the corresponding text from the storage 160.

A command set for system booting is stored in the ROM 142. If a power is supplied through an input of a turn-on command, the CPU 143 copies the O/S that is stored in the storage 160 into the RAM 141 according to a command stored in the ROM 142, and boots the system through execution of the O/S. If the booting is completed, the CPU 143 copies various kinds of programs stored in the storage 160 into the RAM 141, and performs various kinds of operations through execution of the programs copied into the RAM 141.

If the booting of the display apparatus is completed, the GPU 144 displays an item screen, a content screen or a search result screen. Specifically, the GPU 144 may generate a screen that includes various objects, such as an icon, an image, and a text, using an operator (not illustrated) and a renderer (not illustrated). The operator operates attribute values, such as coordinate values, shapes, sizes, and colors of the respective objects, according to a layout of the screen. The renderer generates various layout screens including the objects based on the attribute values operated by the operator. The screen that is generated by the renderer is provided to the display 130, and is displayed in the display region. On the other hand, the GPU 144 displays the contents that the user writes on the touch pad of a remote control device as they are based on the signal received from the remote control device.

The communicator 170 is a configuration that performs communication with various types of external devices according to various types of communication methods. The communicator 170 may include a Wi-Fi chip, a Bluetooth chip, a wireless communication chip, and an NFC chip.

The Wi-Fi chip and the Bluetooth chip perform communication in a Wi-Fi method and in a Bluetooth method. In the case of using the Wi-Fi chip or the Bluetooth chip, various kinds of connection information, such as SSID and a session key, are first transmitted/received, communication connection is performed using such connection information, and then various kinds of information are transmitted/received. The wireless communication chip means a chip that performs communication according to various communication standards, such as IEEE, ZigBee, 3$^{rd}$ Generation (3G), 3$^{rd}$ Generation Partnership Project (3GPP), and Long Term Evolution (LTE). The NFC chip means a chip which operates in a Near Field Communication (NFC) method that uses a band of 13.56 MHz among various RFID frequency bands of 135 KHz, 13.56 MHz, 433 MHz, 860-960 MHz, and 2.45 GHz.

Further, the communicator 170 may communicate with various external server devices, such as search servers. In addition, the communicator 170 may directly perform communication with various types of external devices rather than a server device to perform a search.

The broadcasting signal processor 150 is a constituent element which processes a broadcasting signal that is received from the communicator 170 and converts the broadcasting signal into video data, audio data, and other data. If the broadcasting signal is received, the broadcasting signal processor 150 performs signal processes, such as demodulation, equalization, demultiplexing, deinterleaving, and decoding, with respect to the received broadcasting signal, and generates video frames and audio signals. The generated video frames are provided to the display 130, and the generated audio signals are provided to the speaker 180.

The display 130 and the speaker 180 may output signals that are received from the broadcasting signal processor 150.

As described above, the user can conveniently control the operation of the display apparatus through the writing input on the remote controller.

The method for controlling a display apparatus according to various exemplary embodiments as described above may be stored in a non-transitory readable medium. The non-transitory readable medium may be mounted on various devices to be used.

As an example, a program code for performing the method for controlling a display apparatus, where the method includes: receiving a writing trace made on a touch pad of a remote controller; extracting a text that corresponds to the writing trace; displaying the text and at least one item that corresponds to the text; and if a user's operation is performed in one direction on the remote controller, automatically executing a function that corresponds to the item that is positioned in the direction in which the user's operation is performed, may be stored and provided in the non-transitory readable medium.

The non-transitory computer readable medium is not a medium that stores data for a short period, such as a register, a cache, or a memory, but means a medium which semi-permanently stores data and is readable by a device. Specifically, the non-transitory computer readable medium may be a compact disc (CD), a digital versatile disc (DVD), a hard disc, a Blu-ray disc, a universal serial bus (USB), a memory card, or a ROM.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A display apparatus comprising:
   a receiver configured to receive a writing trace performed on a touch pad of a remote controller;
   a detector configured to extract a character corresponding to the writing trace;
   a display configured to display the character and at least one item; and
   a controller configured to search the at least one item corresponding to the character and control the display to display the at least one item next to the character, and if a user's touch operation is performed in one direction on the touch pad of the remote controller while the at least one item is displayed, automatically execute a function corresponding to an item that is positioned, with reference to a position of the character, in the direction in which the user's touch operation is performed.

2. The display apparatus as claimed in claim 1, wherein if a subsequent writing is performed on the touch pad of the remote controller, the detector extracts a subsequent character from a writing trace according to the subsequent writing, and the controller researches and displays the character and an item that corresponds to the subsequent character on the display.

3. The display apparatus as claimed in claim 1, wherein the display disperses the at least one item in at least one direction from among upper, lower, left, and right directions of a character display region on which the character is displayed to display the at least one item.

4. The display apparatus as claimed in claim 1, wherein if a first character that indicates a channel zapping function is detected, the controller displays a channel-up item on a first side of a first character display region on which the first character is displayed and displays a channel-down item on a second side that is opposite to the first side, and if a second character that indicates a volume control function is detected, the controller displays a volume-up item on a first side of a second character display region on which the second character is displayed and displays a volume-down item on a second side that is opposite to the first side.

5. The display apparatus as claimed in claim 4, wherein the controller displays the first character display region, the channel-up item, and the channel-down item on a first edge region in a screen of the display, displays the second character display region, the volume-up item, and the volume-down item on a second edge region in the screen of the display, performs the channel-up or channel-down operation according to the user's touch operation if the user's touch operation is performed in a state where the remote controller is rotated in a direction of the first edge region, and performs volume-up or volume-down operation according to the user's touch operation if the user's touch operation is performed in a state where the remote controller is rotated in a direction of the second edge region.

6. The display apparatus as claimed in claim 1, wherein if a character that indicates a color button is detected, the controller displays button items of different colors in at least upper, lower, left, and right directions of the character display region, and if the button item is selected, the controller performs a function that corresponding to the selection of the button item.

7. The display apparatus as claimed in claim 1, wherein if a character that indicates a content reproduction control function is detected, the controller displays at least one from among a reproduction button item, a rewind button item, a fast forward button item, and a stop button item in at least upper, lower, left, and right directions of the character display region.

8. The display apparatus as claimed in claim 1, wherein if a drag-and-hold operation is input on the touch pad of the remote controller, the controller successively performs a function that matches an item that corresponds to a drag direction while a hold state is maintained.

9. The display apparatus as claimed in claim 1, wherein the at least one item includes at least one from among an icon, a symbol, a figure, a character, an image, and a photo, and the user's touch operation is a touch-and-drag operation or a flick operation.

10. A method for controlling a display apparatus, comprising:
receiving a writing trace performed on a touch pad of a remote controller;
extracting a character corresponding to the writing trace;
searching at least one item corresponding to the character;
displaying the character and the at least one item next to the character; and
if a user's touch operation is performed in one direction on the touch pad of the remote controller while the at least one item is displayed, automatically executing a function corresponding to an item that is positioned, with reference to a position of the character, in the direction in which the user's touch operation is performed.

11. The method for controlling a display apparatus as claimed in claim 10, further comprising if a subsequent writing is performed on the remote controller, extracting a subsequent character from a writing trace according to the subsequent writing, and researching and displaying the character and an item that corresponds to the subsequent character on the display.

12. The method for controlling a display apparatus as claimed in claim 10, wherein the at least one item is dispersed to be displayed in at least one direction among upper, lower, left, and right directions of a character display region on which the character is displayed to display the at least one item.

13. The method for controlling a display apparatus as claimed in claim 10, wherein the displaying comprises:
if a first character that indicates a channel zapping function is detected, displaying a channel-up item on a first side of a first character display region on which the first character is displayed, and displaying a channel-down item on a second side of the first character display region that is opposite to the first side; and
if a second character that indicates a volume control function is detected, displaying a volume-up item on a first side of a second character display region on which the second character is displayed, and displaying a volume-down item on a second side of the second character display region that is opposite to the first side.

14. The method for controlling a display apparatus as claimed in claim 13, wherein the first character display region, the channel-up item, and the channel-down item are displayed on a first edge region in a screen of the display, and the second character display region, the volume-up item, and the volume-down item are displayed on a second edge region in the screen of the display, and wherein the method further comprises:
if the user's touch operation is performed in a state where the remote controller is rotated in a direction of the first edge region, performing channel-up or channel-down operation according to the user's touch operation; and
if the user's touch operation is performed in a state where the remote controller is rotated in a direction of the second edge region, performing volume-up or volume-down operation according to the user's touch operation.

15. The method for controlling a display apparatus as claimed in claim 10, wherein the displaying comprises if a character that indicates a color button, is detected, displaying button items of different colors in at least upper, lower, left, and right directions of the character display region.

16. The method for controlling a display apparatus as claimed in claim 10, wherein the displaying comprises if a character that indicates a content reproduction control function, is detected, displaying at least one from among a reproduction button item, a rewind button item, a fast forward button item, and a stop button item in at least upper, lower, left, and right directions of the character display region.

17. The method for controlling a display apparatus as claimed in claim 10, wherein the executing comprises if a drag-and-hold operation is input on the touch pad of the remote controller, successively performing a function that matches an item that corresponds to a drag direction while a hold state is maintained.

18. The method for controlling a display apparatus as claimed in claim 10,
wherein the at least one item includes at least one from among an icon, a symbol, a figure, a character, an image, and a photo, and the user's touch operation is a touch-and-drag operation or a flick operation.

19. A display apparatus comprising:
a display configured to display a character corresponding to a writing trace and at least one item; and
a controller configured to search the at least one item corresponding to the character and control the display to display the at least one item next to the character, and if a user's touch operation is performed in one direction on a touch pad of a remote controller while the at least one item is displayed, automatically execute a function corresponding to an item that is positioned, with reference to a position of the character, in the direction in which the user's touch operation is performed.

20. A method for controlling a display apparatus, comprising:
displaying a character corresponding to a writing trace;
searching at least one item corresponding to the character;
displaying the at least one item next to the character; and
if a user's touch operation is performed in one direction on a touch pad of a remote controller while the at least one item is displayed, automatically executing a function corresponding to an item that is positioned, with reference to a position of the character, in the direction in which the user's touch operation is performed.

* * * * *